Nov. 30, 1965 J. E. JENDRISAK 3,220,822
APPARATUS FOR BENDING GLASS SHEETS OR PLATES
Original Filed July 5, 1951 5 Sheets-Sheet 2
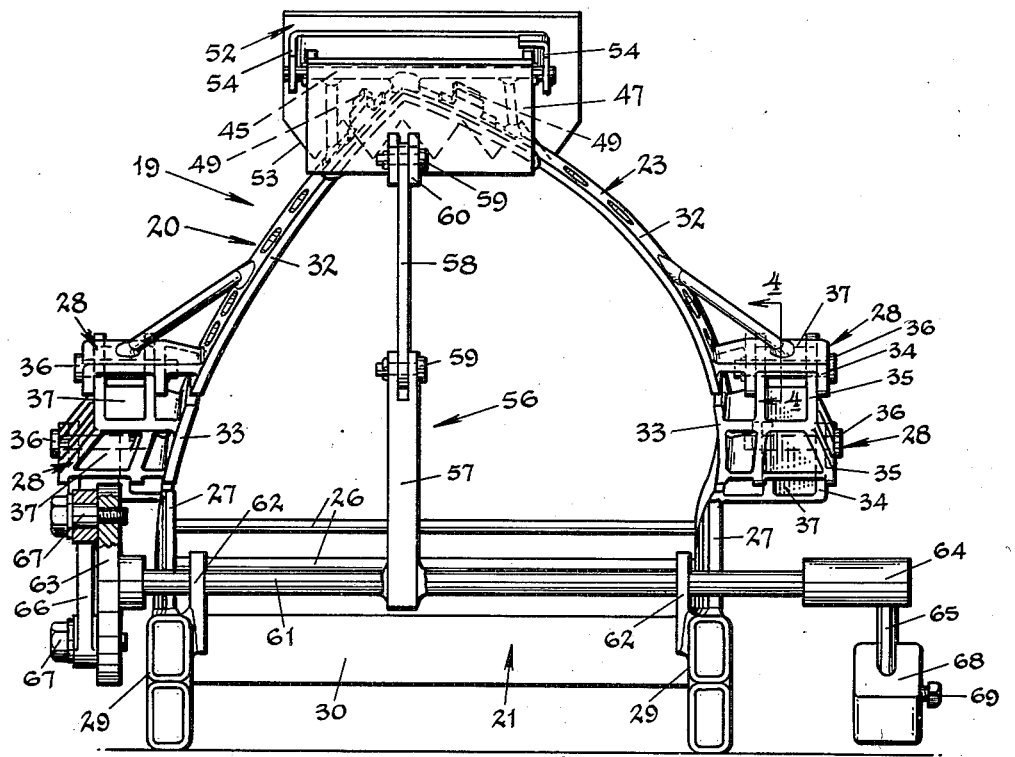
Fig. 3
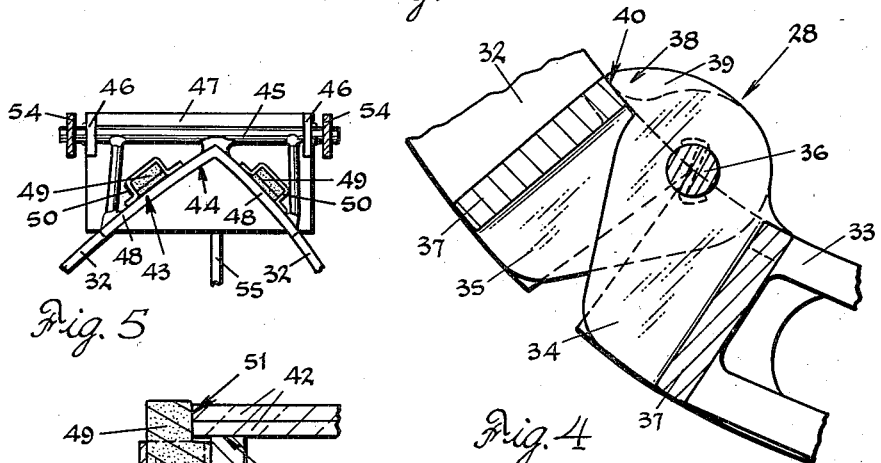
Fig. 5
Fig. 4
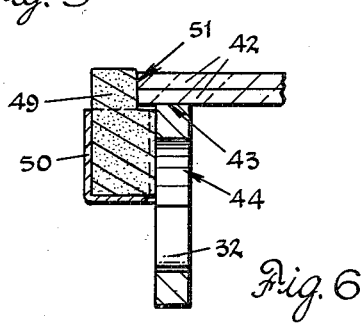
Fig. 6
Inventor
Joseph E. Jendrisak
By Nobbe & Swope
Attorneys

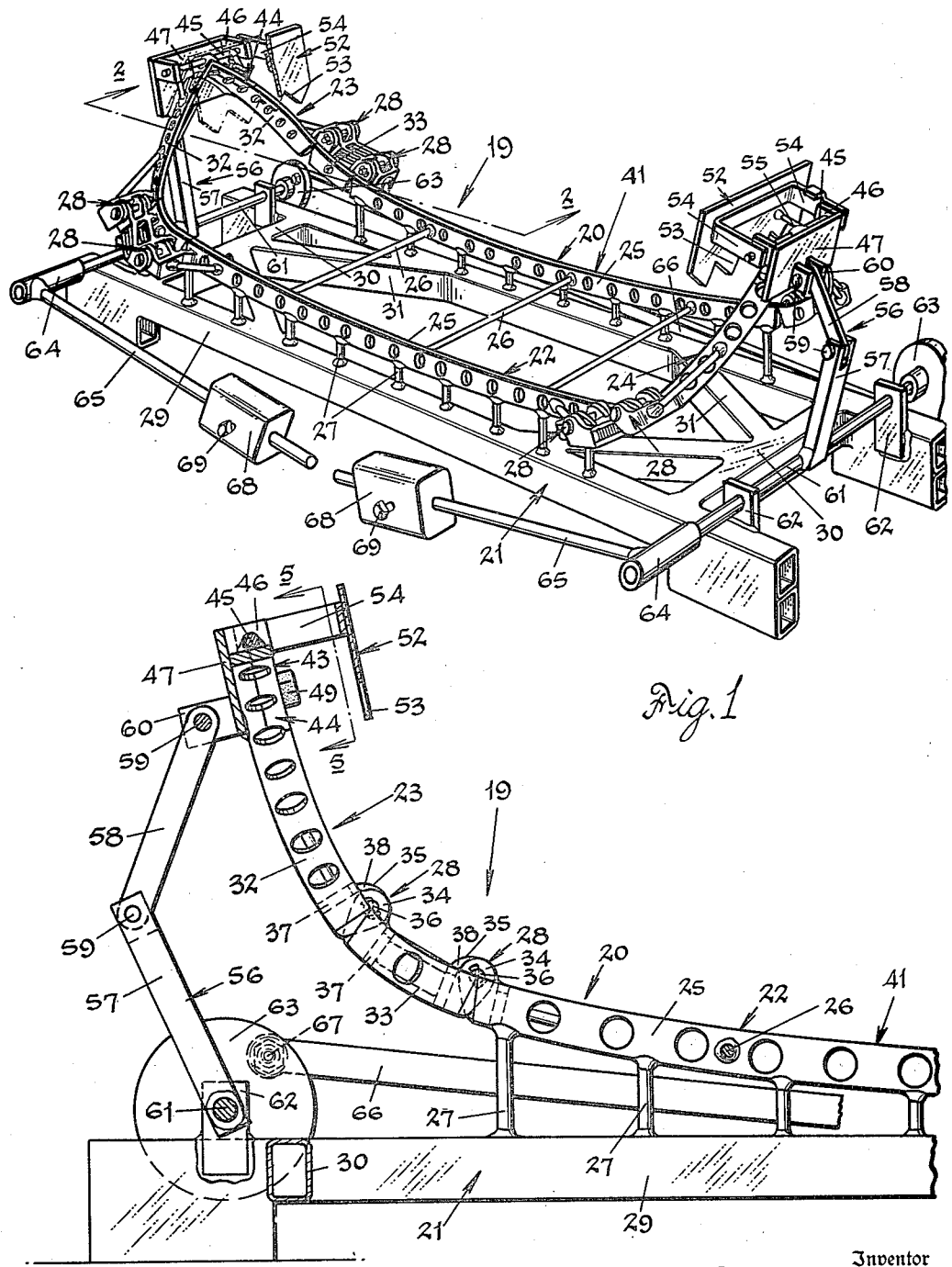

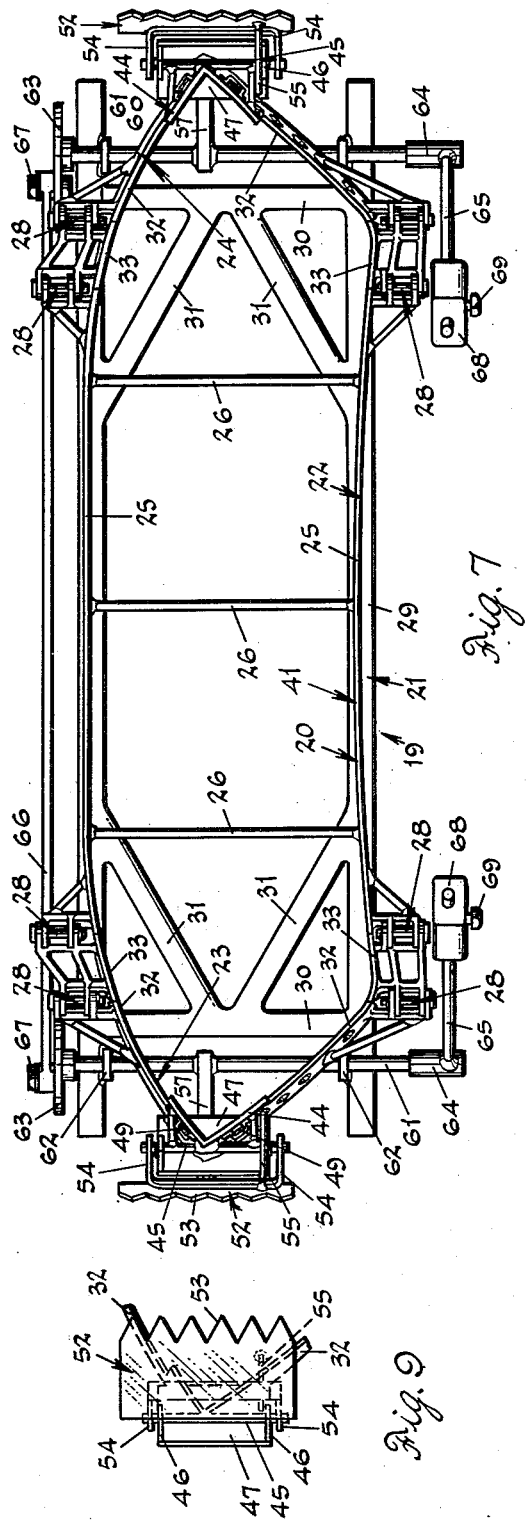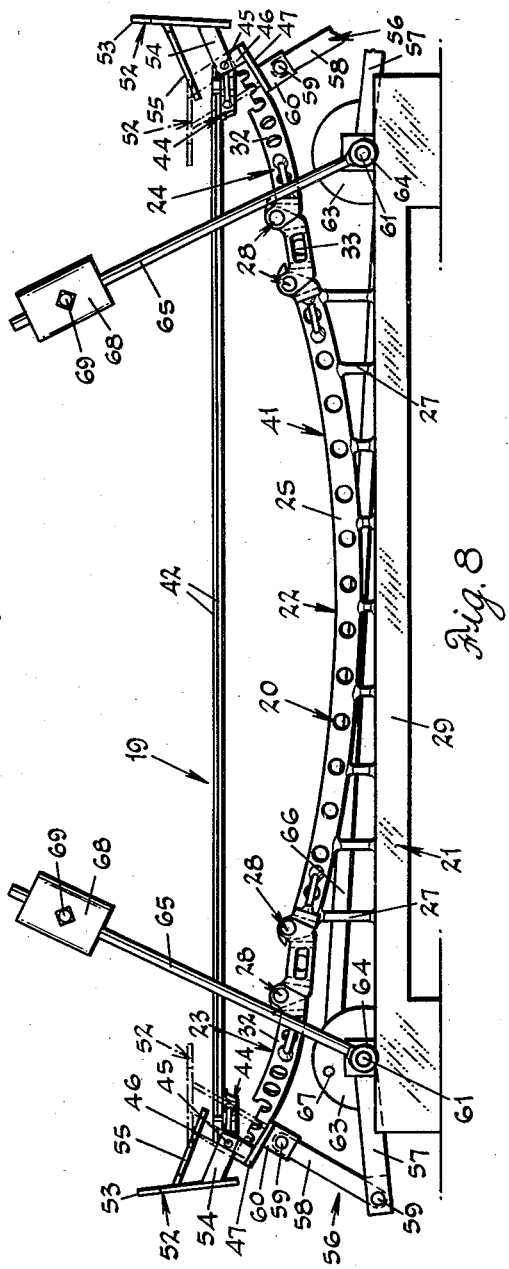

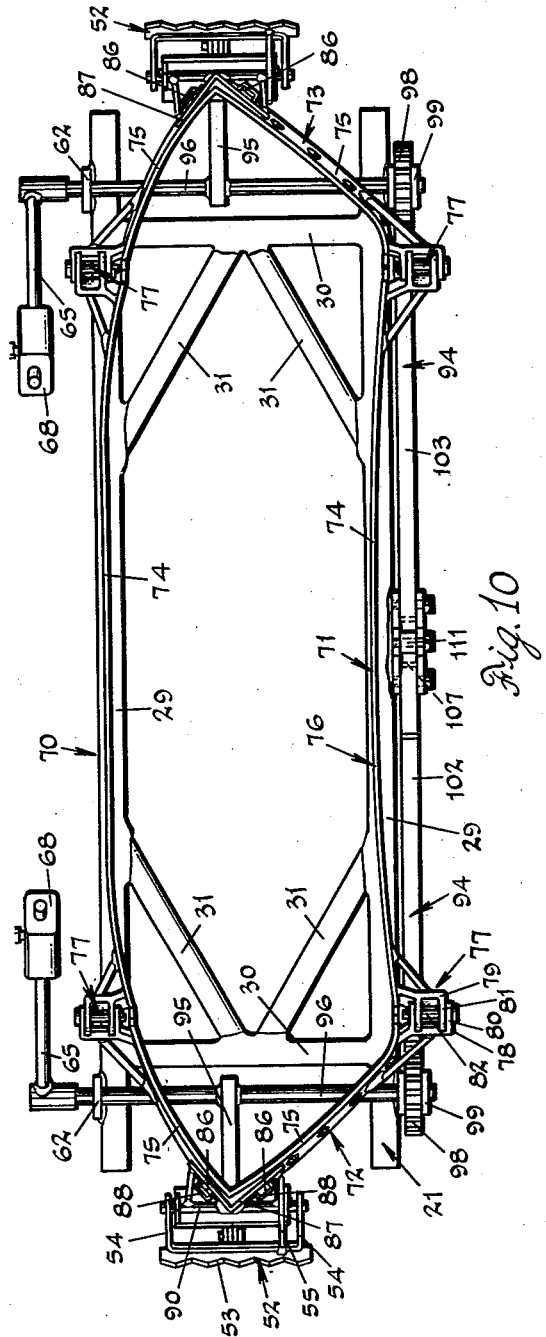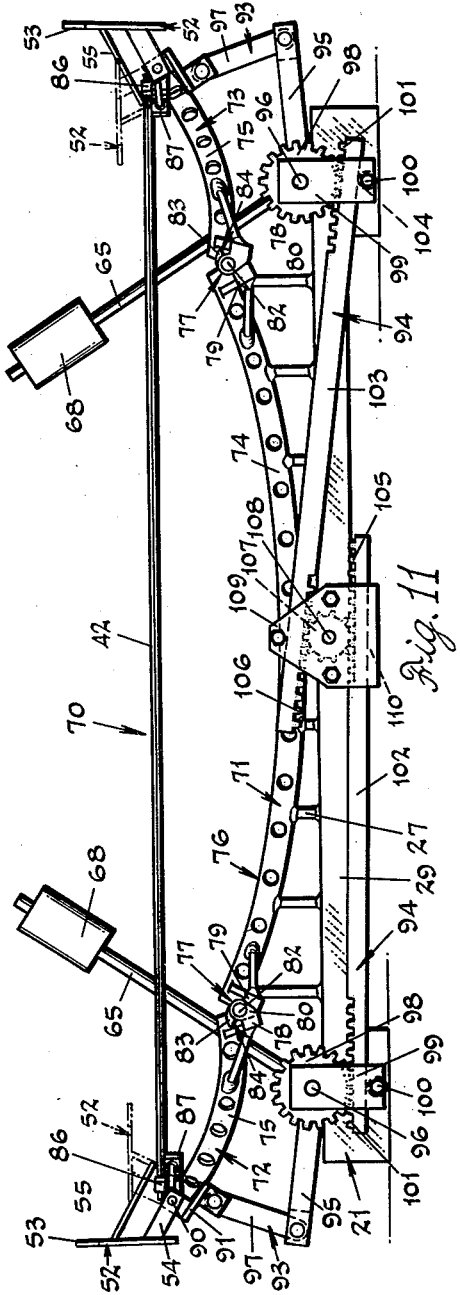

Nov. 30, 1965  J. E. JENDRISAK  3,220,822
APPARATUS FOR BENDING GLASS SHEETS OR PLATES
Original Filed July 5, 1951  5 Sheets-Sheet 5
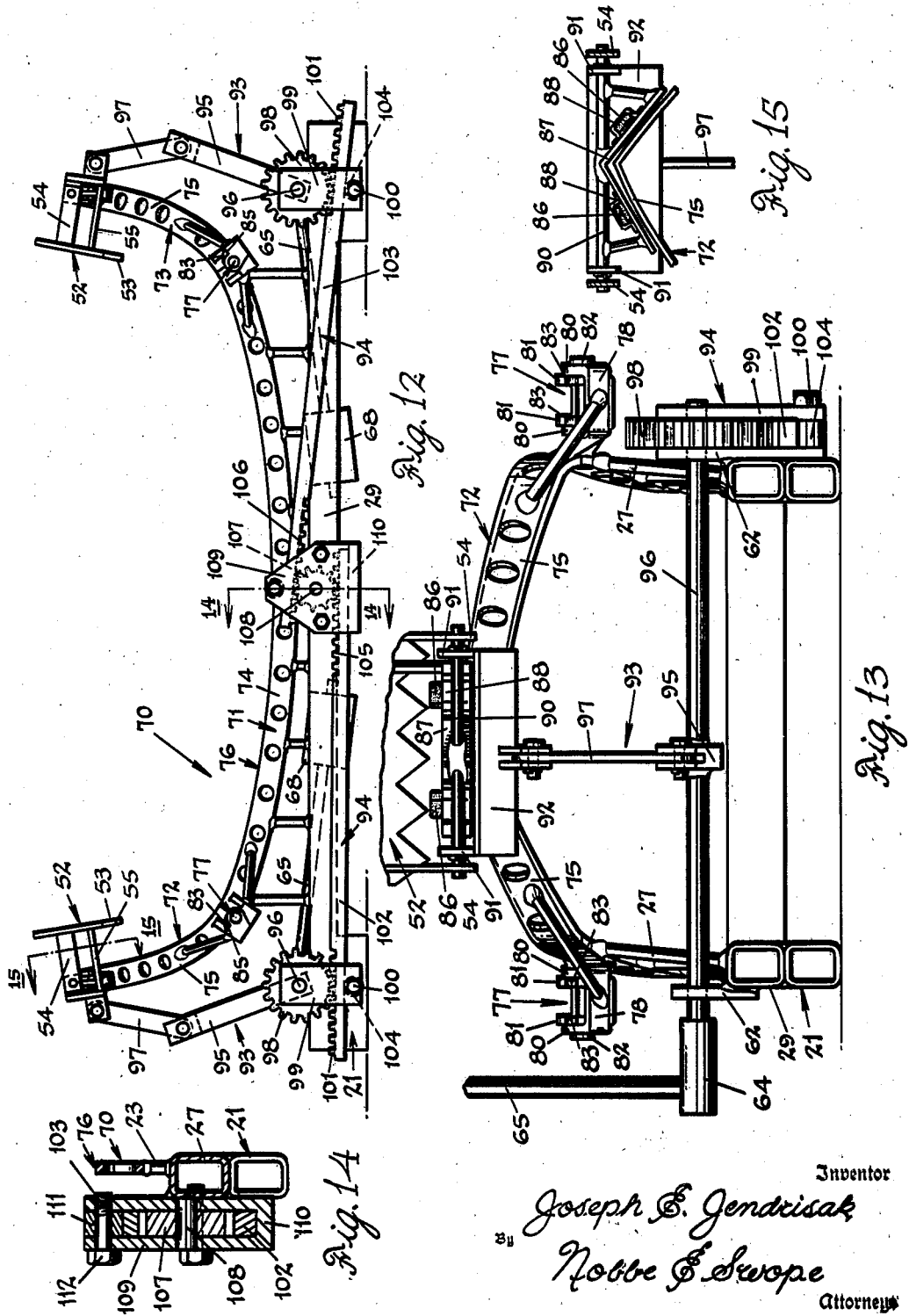

United States Patent Office 3,220,822
Patented Nov. 30, 1965

3,220,822
APPARATUS FOR BENDING GLASS SHEETS
OR PLATES
Joseph E. Jendrisak, Northville, Mich., assignor to Libbey-Owens-Ford Glass Company, Toledo, Ohio, a corporation of Ohio
Continuation of application Ser. No. 579,271, Apr. 19, 1956, which is a continuation of application Ser. No. 235,293, July 5, 1951. This application Feb. 7, 1964, Ser. No. 344,156
10 Claims. (Cl. 65—291)

This application is a continuation of my copending application Serial No. 579,271, filed April 19, 1956, which, in turn, is a continuation of application Serial No. 235,293, filed July 5, 1951, both of which have now been abandoned.

This invention relates broadly to improvements in the bending of glass sheets or plates. More particularly, the invention contemplates a novel method of bending glass sheets in a balanced and progressive manner throughout the bending operation, and an improved bending apparatus by means of which the method can be accomplished.

Briefly stated, this invention is concerned with the supporting and bending of glass sheets, into severe curvatures which may closely resemble a U-shape in elevation; on hinged type open molds. Molds of this type have previously been used for simple bends, and it has been customary to locate and support flat glass sheets only at their opposite ends on such molds, to then bring the sheets to the proper bending temperature and to allow them to freely settle into conformity with the shaping surface of the mold.

However, to produce curved shapes of the U-shape or other more complex nature, requires a somewhat different procedure than the conventional ones commonly employed to produce bent glass of a relatively simple curvature.

Moreover, with the advent of the increasingly popular "one-piece" windshield, it has been found that the materially longer, and usually thinner, glass sheets will not withstand the mass weight of the hinged mold when it is allowed a normal freedom of bending influence. These longer and thinner glass sheets are of course assembled in matched pairs, prior to the bending operation, and these pairs are subsequently processed into a bent laminated structure having an interlayer of suitable thermoplastic therebetween. Pairing of the sheets is thus necessary to insure that each outer component of the laminae will be a duplicated curve of the other when bent.

According to the present invention, the mold of the improved apparatus is so constructed that endwise forces may be directively applied to the glass sheet or sheets in a progressive manner to first support and then to actually fold the ends of the sheet inwardly as the major portion thereof settles into registering support on the shaping surface of the mold.

It is an aim of the invention to provide an improved bending apparatus which includes a hinged mold that is adapted to support glass sheets while flat and to subsequently carry them into final bent shape, while closing to present a properly contoured shaping surface for the glass, together with means coacting with the mold to effect movement of the glass to the shaping surface by application of a progressively increasing force.

Another object is the provision, in a method of bending glass sheets or plates and an improved apparatus therefor, of a bending mold of the open ring, hinged construction wherein sections of the mold are oriented in a balanced open position to receive a glass sheet when flat and are adapted to be moved toward their closed position with progressively increasing force to carry the ends of the glass sheet into bent conformity with the mold shaping surface at the end of the bending operation.

Another object of the invention is to provide an improved bending apparatus including a mold of the above character which has a stationary central section and hingedly related end sections, the end sections being adapted to be oriented in open position to receive a glass sheet when flat and being influenced by operatively associated weights to carry the adjacent ends of said sheet into conformity with the shaping surface of the mold with increasing force as the glass sheet settles thereagainst when properly heated.

A further object of the invention is the provision of a mold of the above character which includes a stationary central section and hingedly balanced end sections, and a shaping surface formed thereon conforming to the curvature of a finally bent glass sheet, and in which the end mold sections are simultaneously operable and responsive in motion to the forces of operatively associated weights which forces are inversely proportional to the rigid character of the glass sheet when flat and operable to progressively increase the efforts of their force as the properly heated glass becomes susceptible to inward and upward bending into conformity with the shaping surface when the mold sections are in closed position.

A further object of the invention is to provide a bending mold assembly of hingedly connected central and end sections in which the end sections are movable outwardly to an open position of the mold to receive a flat sheet of glass therebetween and balanced by weighted elements to reduce endwise compression forces on the glass and subsequently movable to the closed position as the glass softens, the elements producing the balanced relation of the end mold sections being adapted to exert their influence within an adjustably wide range of force.

Other objects and advantages of the invention will become more apparent during the course of the following description when taken in connection with the accompanying drawings.

In the drawings, wherein like numerals are employed to designate like parts throughout the same:

FIG. 1 is a perspective view of a preferred form of bending apparatus constructed in accordance with the invention;

FIG. 2 is a vertical, longitudinal section through one end of the bending apparatus of FIG. 1, taken substantially along the line 2—2 of that figure;

FIG. 3 is an end elevation of the bending apparatus of FIG. 1;

FIG. 4 is a sectional detail view of one of the hinges for the bending mold, taken substantially along the line 4—4 of FIG. 3;

FIG. 5 is a fragmentary, sectional plan view of one end of the apparatus, taken substantially along the line 5—5 of FIG. 2, and showing one of the mold locators in detail;

FIG. 6 is an enlarged, sectional detail view of the locator of FIG. 5 and a portion of the mold with glass supported thereon;

FIG. 7 is a plan view of the bending apparatus, showing the mold sections thereof in their open position;

FIG. 8 is a side elevational view of the bending apparatus showing the mold sections positioned as shown in FIG. 7;

FIG. 9 is a fragmentary top view of a heat shield carried on the ends of the mold;

FIG. 10 is a top or plan view of a modified form of bending apparatus, showing the hinged mold sections thereof located in open position;

FIG. 11 is a side elevational view of the modified form of bending apparatus, showing the mold sections in open position;

FIG. 12 is a similar side elevation of the modified bending apparatus, showing the hinged mold sections in their closed position;

FIG. 13 is an end elevation of the modified apparatus with the hinged mold sections in their open positions as shown in FIGS. 10 and 11;

FIG. 14 is an enlarged, detail, sectional view taken substantially along line 14—14 of FIG. 15; and FIG. 15 is a fragmentary, sectional, plan view, taken substantially along the line 15—15 in FIG. 12, and showing the locators in detail.

In bending glass sheets on outline, hinged type molds, the sheet, prior to heating, is usually supported solely at its opposite ends and operates as a strut or horizontal column between the opened end sections of the mold to maintain the mold in open or distended position. Ultimately when heated properly to its bending temperature, the glass sheet settles into conformity with the mold and in so doing is susceptible to the weight of the mold so that it is bent into complete registry, especially with the shaping surfaces of the end mold sections when they are in the closed position. Advantage may be taken of this rigid character of the glass in bending on molds of the hinged type, which have been found to be particularly well adapted to produce bends of a compound curve or U-shape because, by reason of their related sections, they can be expanded into an open position sufficiently to accommodate a glass sheet of considerable length.

However, in the event of bending of relatively long and/or thin sheets of glass on molds of such hinged construction, a controllable force must be employed so that it can be progressively increased in its application, and, when the major mass of the glass sheet is supported on the mold, this force can be adapted to operate upon the softened glass sheet and shape it, particularly in the end areas, until these end areas are actually folded inwardly with respect to the central or major area. Bending molds, as provided by the present invention, are thus especially adapted to the bending of relatively long and/or thin glass sheets which are bent in pairs for ultimate use in the construction of bent laminated units.

With reference now to the drawings, there is disclosed in particularly FIGS. 1 to 9, inclusive, an example of a preferred form of bending apparatus, constructed in accordance with this invention and designated in its entirety by the numeral 19. The mold comprises an open, peripheral or ring type mold 20 that is bodily carried on a supporting frame or rack 21.

According to this invention, the mold 20 comprises a plurality of hingedly related sections of which the central section is stationarily supported on the rack 21 while the end sections are hingedly connected to said central section and their associated movements are influenced by radially acting forces or weights so that the action of their movement with respect to the supported glass sheet, or sheets, ranges from a low value of force to a higher value that is inversely proportionate to the strength of the glass during the bending operation. As herein shown, the mold 20 is composed of the stationary central section 22 and hinged related end sections 23 and 24. The central mold section is formed by thin, suitably shaped rails 25 that are interconnected by transversely disposed braces or rods 26. The rails 25 are supported on the rack 21 by means of pillars 27. These are arranged in spaced relation between the rack and the central section 22 of the mold. The rail sections 25 and the end sections 23 and 24 are hingedly connected by means of hinges generally indicated at 28.

The rack 21 is generally rectangular in form and includes side members 29 and laterally disposed cross members 30 which are reenforced by braces 31 positioned diagonally between the side and cross members. These frame members are arranged with respect to one another to afford open areas beneath the mold 20 thereby permitting equal distribution of the furnace heat to all areas of the glass sheet or sheets.

In the preferred form of mold, the end sections 23 and 24 of the mold 20 each comprise convergently disposed rail elements 32, and rail elements 33 that are interposed between the adjoining ends of the sections 23 and 24 and the rails 25 of the centrally disposed mold section 22. The several rail elements 32 and 33 are hingedly associated with one another and the rails 25 by means of the hinges 28.

These hinges are formed by overlapping U-shaped members 34 and 35 in which the pins 36 are journaled and which are carried in spaced relation from the several rails by their laterally extending webs 37. Preferably, the axes of the pins 36 are disposed in horizontal alignment with the upper edges of the rails 25, 32 and 33. As shown in FIGS. 1 and 8, the several interconnected parts of the mold 20 may thus be swung with respect to each other from the closed position to their open position and since the hinge pins 36 are in horizontal alignment with the upper surfaces thereof there is actually little separation of said surfaces from their closed continuity.

The overlapping U-shaped members 34 and 35 of the hinges 28 are also provided with stops 38 which limit the extent of the hinged motion of the several parts of the support 21 to their closed position thereby preventing any tendency toward inverse or overbending. As shown in FIG. 4, the inner members 34 of the hinges 28 have outwardly protruding lugs 39, the surfaces 40 of which are machined to engage the top surfaces of the adjacent webs 37 at the moment of closing. When the several sections of the mold 21 are disposed in their closed positions, their upper edges constitute the shaping surface 41 of the mold upon which the glass sheet is shaped into its finally bent form.

Each end mold section 23 and 24 has mounted thereon means for initially locating a glass sheet or sheets as indicated at 42 on the mold 20. As shown in FIGS. 2 and 5, this locating means is defined by a part of the convergently disposed rails 32 and in the apex or crotch formed thereby. The upper surface 43 of a pivotally operable crotch member 44 thus may be employed as a ledge to support and carry the ends of the flat sheets 42 and ultimately aid in the shaping of the same in and during the bending operation. To suitably bring about this dual function of the crotch member 44, the same is formed as a separate but mutually shaped and related part of the rails 32 and is pivotally mounted with respect thereto for movement in and out of line with the shaping surface generally. The crotch member is carried by a shaft 45 that is journaled at its ends in uprights 46 from a platform 47. The platform 47 is fixedly secured to the lower edge surfaces of the rails 32 and the shaft 45 is carried by the uprights thereof so that its axis is disposed slightly above the edge to edge joint effected between the crotch member 44 and the rails 32. The crotch member 44 will thus locate the upper surface 43 thereof above the shaping surface generally, when the crotch member is raised, but will normally balance or remain by gravity in its interfitting relation with the rails 32 of each end mold section unless caused to move therefrom.

To provide for locating the glass sheet within and upon the crotch members 44, each of the legs 48 thereof are provided with locator blocks 49. The blocks may be of any suitable construction and as herein shown, are of marinite, or like composition, which will not mar or fuse to the glass during the bending operation. As shown in detail in FIG. 6, the blocks are carried in brackets 50 and are substantially L-shaped so that the edges of the glass sheet will engage one surface of the block as indicated at 51 while the surface of one sheet is supported solely on the upper edge 43 of the crotch member 44.

Provision is also made for regulated heating of the glass sheets particularly in their extreme end areas since these areas are proportionately small in cross section and their response to the required heating conditions for the body of the sheet will obviously cause them to absorb more heat and literally "curl" away from the shaping surface. Suitable shields 52 are accordingly disposed above these end areas of the sheets and they are of a notched configuration along one edge 53 to produce a heat gradient upon the glass. The shields 52 are pivotally supported on the shafts 45 by means of legs 54 and their elevation above the glass is established by means of a prop 55. While loading a glass sheet, the shields 52 are swung out of the way as shown in FIGS. 7 and 8 and later returned to their shielding positions above the glass as shown by phantom line in FIG. 8.

In the present mold construction, each of the end sections 23 and 24 are swung from their closed to their open positions, when the bending mold 20 is in the glass receiving position, and subsequently returned to their closed positions by means of a weighted toggle lever generally indicated at 56. A lever arrangement at each end of the bending apparatus 19 is linked to an oppositely disposed lever to obtain an equality and balance of motion between the end sections 23 and 24 and the weighted element thereof is angularly disposed so that in the open position of said sections, the body weight of the sections substantially corresponds to the effective weight of said element to obtain a counterbalanced condition while the glass sheet is initially carried in a flat condition.

This toggle lever arrangement 56 comprises an arm 57 and a link 58 pivotally connected by pins 59 at its opposite ends to the arm 57 and a U-shaped plate 60 secured to the platform 47. The arm 57 is fixedly secured to a shaft 61 that is journaled intermediate its ends in plates 62 secured to the side members 29 of the rack 21. The ends of the shaft 61 project beyond the side surfaces of the said rack 21 to carry an annular disk 63 at one end of the shaft and a collar or tubular end 64 of a rod 65 at the opposite end.

The disk 63, carried by a shaft 61 at one end of the rack, and the corresponding disk 63 on the oppositely disposed shaft 61 are interjoined by a link 66, the ends of which are pivotally secured to the disks by shouldered bolts 67 (FIG. 3). The bolts 67 are located in the related disks 63 so that ends of the link 66 will be disposed on the said disks 63 an equal distance from the axes of the shafts 61 but in opposition to each other, that is to say, above and below said shaft axes, to cause said shafts to rotate in unison but in opposite directions. Actuation of one toggle lever 56 will thus be transmitted to the opposite lever 56.

The rod 65 of each toggle lever arrangement 56 is carried at the opposite end of the related shaft 61 from the disk 63 and is angularly disposed with reference to a vertical plane through the axis of their related shaft. The rods 65 are each provided with a weight or block 68 that may be adjusted to any position along the rod and secured therein by a lock screw 69. The degree of angularity of the rod 65 and the position of the weight or block 68 thereon is determined by the magnitude of the counterbalance to be effected between said weight and the associated end sections 23 and 24 of the mold 21. Preferably the perpendicular load created by the weight 68 is ascertained by the endwise or outward thrust imposed by a sheet of glass against the locators 49 and as sustained by the relation of the crotch member 44 and the sections 23 and 24. Accordingly, the weights 68 are shifted along the rods 65 until their mass, acting through the shafts 61 and toggle levers 56, is comparably balanced to the normal thrust of the flat glass.

In practice, the end sections 23 and 24 are swung outwardly and downwardly by manually lifting one of the weights 68 from the position shown in FIG. 1 and, through the link 66, causing the opposite weight to be raised. This action is produced by rotation of the immediately associated shaft 61 and disk 63 thereon and by the link 66 causing the oppositely disposed disk 63 to rotate its related shaft 61 and consequently the rod 65 and weight 68. Simultaneously the arm 57 of each shaft 61 will be caused to swing in opposed, outward directions and through the links 58 to produce movement of the end sections 23 and 24 into their open positions as shown in FIGS. 7 and 8.

The shields 52 are now swung about the shafts 45 to their outer positions at which time the crotch members 44 will be substantially exposed to receive a sheet or sheets of glass 42. When the ends of the glass sheets are placed upon these members 44, and between and against the locators 49, a slight outward thrust is imposed to swing said members upwardly on the shafts 45 to support the flat sheets above the shaping surface 41. The shields 52 may now be returned to their original positions above the ends of the glass.

During the initial interval of the bending operation, the counterbalance effected between the weights 68 and the sections 23 and 24 will prevent the sections from rising toward their closed positions but more particularly will reduce the compressive thrust otherwise imposed endwise upon the glass.

As the sheets become properly heated throughout and begin to settle toward the shaping surface 41, the central area thereof will sag toward the corresponding area of the said surface and gradually increase in the amount of area received thereupon. In a related action, the end sections of the mold will follow inwardly and upwardly and the rate of their joint motion will depend upon the increasing influence of the weights 68. As the over-all strength of the glass sheet weakens and is dissipated, the influence of the weights proportionally increases until, by reason of their weight, the toggle levers 56 are caused to coact and raise the end sections 23 and 24 in a completing movement to their closed position. Also during the last period of the bending operation, the crotch members 44 will swing with the diminishing strength of the glass and their own momentum into position to complete the shaping surface at each end of the mold.

In FIGS. 10 to 15, inclusive, there is shown a bending apparatus that is generally operable in the same manner as that previously described in connection with FIGS. 1 to 9, inclusive. However, in this modified form of apparatus, operation of the end mold sections is obtained by means of a modified construction by which the influence of weighted elements is balanced between the ends of the mold, generally indicated by the numeral 70, through associated rack and gear mechanisms.

The bending mold 70 is supported upon a rack 21 and comprises a central mold section 71 and end mold sections 72 and 73. The central section 71 is formed by suitably shaped rails 74 which are fixedly supported above the frame 22 by pillars 27, as previously described. The end mold sections 72 and 73 are wedge-shape in plan and the convergently disposed legs or rails 75 thereof are shaped both in plan and elevation to complete the curved contour of the mold and in combination with the centrally disposed rails 74 afford a glass shaping surface 76 on their upper edges.

The adjoining ends of the rails 74 and 75 are pivotally interconnected by means of hinges 77 so that the end mold sections 72 and 73, formed by the rails 75, may be swung outwardly with respect to the central mold section 71 to bring the mold bodily into its open or glass receiving position. As herein shown, the hinges 77 are formed by especially cast bifurcated members 78 and 79 which are secured to the rails 74 and 75 in areas adjoining their ends. These bifurcated members have pairs of overlapping ears 80 and 81, respectively, in which the journals for hinge pins 82 are provided. The innermost pair of ears 81 have outwardly directed lugs 83 formed thereon above the axis of the related pin 82 and the under surfaces 84 of the lugs are machined to engage the upper surface of the web 85 between the ears 80 of the bifurcated members 78. The surfaces 84 of the lugs 83, throughout the mold construction, coact to limit the motion of the mold generally, when it or the end sections thereof have moved to their closed positions with reference to the central section 71.

Each of the end mold sections 72 and 73 is provided with locating devices 86 by which the glass sheets 42 are positioned on the mold and through which the sheets when flat operate as a column or strut to maintain the same in its open position. The locating devices are carried by V-shaped supporting members 87 in brackets 88 that are secured to the outer surfaces of the legs 89 of the V-shaped supports.

Each of these supporting members, as shown in FIG. 15, is located in close proximity to the apex of the convergent rails 75 of the end mold sections 72 and 73 and is pivotally carried by means of a shaft 90 so as to be radially movable to positions above and below the upper surface of said rails. More particularly, the supporting shaft 90 for each member 87 is journaled adjacent its ends in uprights 91 that are formed integrally with a plate 92 secured to the undersurface of the rails 75 The shaft 90 is supported in an elevation of its axis with reference to the upper or glass shaping surface of the related section so that in rotating in one direction, it will raise the supporting member 87 into a glass receiving position above said shaping surface or, in the other direction, it will carry the supporting member downwardly away from its glass engaging position. Preferably the supporting member will thus be balanced by its own weight so that it will readily fall away from the glass as the same is received on the shaping surface 76 and will engage the glass only while there is sufficient strength in the body of the glass to exert an outward and endwise thrust.

As herein provided in the modified construction, the end mold sections 72 and 73 are movable outwardly and downwardly to present the mold 70 in glass receiving position in an associated movement that is effected through weighted toggle levers, generally indicated by the numeral 93, and rack and gear mechanisms generally indicated at 94. The arms 95 of the toggle levers 93 are carried by shafts 96 and connected through links 97 to the respective end mold sections 72 and 73 as previously described in connection with the arms 57. The shafts 96 are journaled in the plates 62 secured to the side members 29 of the rack 21. At one end thereof, the shafts 96 carry the weighted rod 65 and their rotation is controlled by the effectual disposition of the mass of the weights 68. At their opposite ends, each of the shafts 96 is provided with a pinion or gear 98 that is located between the plate 62 and a keeper plate 99 secured in parallel therewith by means of a bolt 100.

The gears 98 operate with gear rack or toothed end portions 101 of bars 102 and 103 which are supported in meshing relation with their respective gears 98 by means of sleeve bearings 104 carried on the shanks of the bolts 100. The bars 102 and 103 are located along one side of the rack 21 and their inner, opposed ends are provided with gear racks or toothed end portions 105 and 106, respectively, which are disposed in meshing relation with a gear 107. The shaft 108 for this gear is journaled in the side walls of a U-shape bracket 109, as will be noted in FIG. 14. As shown therein, the bracket 109 is fixedly secured to a side member 29 of the frame and the end of the bar 102 is slidably supported on the web 110 so that the toothed portion 105 thereof is supported in mesh with the gear 107. The gear toothed section 106 of the bar 103 is meshed with said gear in diametrically opposed relation to the teeth 105 of the bar 102 and is slidably retained in such relation by means of a sleeve bearing 111 carried by a bolt 112 in the upper ends of the bracket 109.

By this arrangement, either of the bars 102 and 103 will obviously produce individual rotation of the gear 107 and impart endwise motion to the opposite rack bar, to the end that the rack bars will be simultaneously actuated and caused to move in opposite directions to effect rotation of their related gears 98 in a similar manner. Now, when each of the bars are moving in an inward direction, the gears 98 will be operatively driven to rotate their related shafts 96 and consequently swing the arms 95 in an outward and downward direction. Through the links 97, the related end mold sections 72 and 73 will be correspondingly swung outwardly and downwardly about the axes of the hinges 77 to bring them into the open position of the mold. Simultaneously, the rods 65 will be rotated upwardly, from substantially the position shown in FIG. 12 to the position shown in FIG. 11. Now, the effective mass of the weights 68 will tend to cause a reversal of this sequence of motion and, through the shafts 96, bring the sections of the mold to their closed positions while causing the gears 98 to shift the bars 102 and 103 endwise in opposed, outward directions. The purpose of the bars is thus to coordinate the movement of one end mold section to the associated movement of the other and to transmit the influence of the weights 68 with equal force between the two.

As previously set forth, the aim of the weights 68, and their location on the rods 65, is to initially balance the weight of the associated end mold sections when the glass sheets are received thereon. Accordingly there will not be imposed on the ends of the sheet any weighted force above a normal amount considered necessary to maintain said end sections in their open positions. This of course is aided by employing the glass sheets, when flat, as a horizontal column or strut and obtaining the effect thereof through engagement of the locators 86 at the opposite ends of the sheets. However, when the glass becomes properly heated and loses this rigid property, the mass of the weights 68 will induce a downward direction of motion which is imparted through the rods 65 to the shafts 96. In a sense, the rods 65 act as crank members by which the shafts will be rotated and the rate of rotation of either shaft will be transmitted through the bars 102 and 103 and gears 98 and 107 to equalize the rate or force of motion between the opposite ends of the mold.

The glass sheets to be bent may also be protected from the heat conditions of the furnace required to affect the glass generally, causing it to soften and sag onto the shaping surface 76 of the mold. As previously provided on the mold 20, the end sections 72 and 73 have heat shields 52 that are pivotally supported by their legs 54 on the shafts 90. The notched edge 53 of the shield produces a gradient in the heat received by the end areas of the glass and prevents these areas from overheating or absorbing heat sufficiently to "curl" inwardly in a curve greater than that determined by the shaping surface 76. This particularly important when bending a pair of relatively thin glass sheets since the end areas of one sheet may respond in a greater or lesser degree to the heat than the same areas of the other sheet and as a consequence produce irregularly curved end sections in the sheets which will not be in conformity to the curvature of the shaping surface to which the sheets in their entirety are bent. The shields 52 thus provide for maintaining the end areas of the sheets at a lower range of heat and, in the type of bend herein shown as an example, these end areas have a fairly shallow convexity but are shaped upwardly with respect to the central area of the sheets. The heat that is directed toward and absorbed in the central area therefore causes the sheets to be suitably shaped into conformity with the mold while the end areas are maintained in substantially a flat condition until the end sections of the mold, in closing, complete the shaping surface and actually gather or fold the end areas in an upwardly directed motion to shape them into the desired bent form.

When preparing the modified construction of bending apparatus for the bending of glass, the end mold sections 72 and 73 are moved to their open positions by raising either of the rods 65. This motion is carried by the related shaft 96 to the gear 98 and the bar meshing therewith. The actuated bar causes the gear 107 to rotate and transmit the endwise motion of the one bar to the other in a reversal of directional movement. The opposite gear 98 will then be rotated and likewise the opposite shaft 96. Since the shafts 96 are now rotating in unison, the arms 95 thereon will move the end mold sections simultaneously. The glass sheets 42 are placed with their opposite ends in engagement with the locators 86 and with the surfaces of the end areas resting upon the upper surfaces of the V-shaped supporting members 87.

When manual control of the rod or rods 65 is removed, it will be found that the counterbalance developed between the weights 68 and the end mold sections will be of a proportionate nature to the rigid property of the glass when flat and the weights will not impose sufficient force through the rods 65 and toggle levers 93 to shatter the glass or unduly bend the same before heating. As the glass becomes properly heated during passage of the mold through the furnace, it begins to soften and sag into marginal registry with the shaping surface 76, and particularly in the central area thereof. Now, the strength of the initial rigidity in the glass is gradually dissipated and the force of the weights 68 becomes influential in causing rotation of the shafts 96. This force is equalized through the rack and gear mechanisms 94 between the ends of the mold. As the weights descend in a radial path described by the rods 65, the effectiveness of their forces continues to become more pronounced and the end sections are pivoted on the hinges 77 toward their closed positions. The end areas of the glass sheets are thus carried upwardly by the support members 87 until they, by their own balance, fall away from the glass and the surfaces of the end mold sections move these end areas into the complex bends created by said mold sections when in their closed positions.

These examples of improved mold constructions are particularly useful in carrying out the method of producing bends of a compound contour in relatively long and/or thin sheets of glass or pairs of the same. By means of their novel construction, it is now possible to shape relatively thin sheets into substantially a U-bend and to influence their shaping movement by means of a gradual force that inversely becomes greater as the glass softens when properly heated. This involves the steps of supporting the sheets to be bent in bending relation over the separated portions of the shaping surface of the mold; applying force of a minor degree at the edges of the sheets to employ the same as a column or strut; proportionally increasing this force on the glass as it bends and approaches the shaping surface and utilizing this force at its maximum to bring the separated portions of the shaping surface of the mold together in an upward and inward course of motion tending to literally fold the end areas of the sheets into conformity with the closed portions of the shaping surface.

Application of force in a gradual and positive manner is especially advantageous in bending operations wherein the particular pattern of the glass sheet or sheets presents an elongated outline and/or one in which the required length of glass materially exceeds its width. The elongated outline of glass, as herein shown by way of examples thereof, and the particular thickness of the glass diminishes its utility as a primary column or strut to hold the mold open since both of these factors reduce the extent of its stable character to withstand the stress ordinarily imposed by the weight of the open mold. By counterbalancing this normally imposed weight and, in a progressive manner, exerting force through the influence of increasing weight, it is now possible to maintain a pair of glass sheets in registry with the shaping surface of the mold and in a unison of movement and to obtain thorough conformity of each sheet to the mold contour despite the fact that the glass sheets of themselves cannot completely settle onto said surface but actually require suitable forces to shape them to the desired contour.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In apparatus for bending glass sheets or plates, a periphery type mold formed of a plurality of sections including oppositely disposed end sections, means for hingedly connecting the sections together for movement from a closed to an open mold position, means for supporting the mold intermediate the ends thereof, a weight, means mounting said weight for swinging movement and connecting said weight to at least one of the said end mold sections and means interconnecting the said end sections to move the same in substantial synchronism from a counterbalanced relation in the open mold position toward the closed mold position with progressively increasing force.

2. In apparatus for bending glass sheets or plates, a mold supporting rack, a periphery type mold formed of a plurality of sections including a fixed intermediate section mounted on said rack and oppositely disposed end sections, means for hingedly connecting said end sections to the intermediate section for movement from an open to a closed mold position, means interconnecting the said end sections for transmitting the movement of one to the other, and means operatively connected with at least one of the said end sections for moving both of said end sections from the open to the closed mold position with progressively increasing force.

3. In apparatus for bending glass sheets or plates, a mold supporting rack, a periphery type mold having a shaping surface conforming to the marginal area of a bent glass sheet, the mold having a stationary central section mounted on said rack and including oppositely disposed end sections, means for hingedly connecting said end sections to the stationary central section for movement from a closed to an open mold position to receive an unbent sheet of glass therebetween, a shaft journaled on said rack, a weighted arm carried at one end of the shaft, a lever fixedly secured to the shaft in angular relation to the weighted arm, means connecting the lever to one of the end mold sections and means interconnecting the said end mold sections for counterbalancing their weight in the open mold position and moving the same toward the closed mold position with progressively increasing force.

4. In apparatus for bending glass sheets or plates, a periphery type mold formed of a plurality of sections including an end section, means for hingedly connecting the end section to an adjacent section for movement from a closed to an open mold position, means for supporting the mold intermediate the ends thereof, a shaft journaled on said mold supporting means, a weighted arm carried at one end of the shaft, a lever carried intermediate the ends of said shaft in angular relation to the weighted arm, and means connecting the lever to said end mold section and counterbalancing the weight of the same by the weighted arm in the open mold position.

5. In apparatus for bending glass sheets or plates, a periphery type mold having a shaping surface conforming to the marginal area of a bent glass sheet, the mold being formed of a central section and hingedly related end sections, means for supporting the mold by the central section thereof, the end mold sections being movable from a closed to an open mold position to receive an unbent sheet of glass therebetween, weighted means pivotally supported on said mold supporting means, and linkage means connecting said weighted means to said end mold sections to counterbalance the weight thereof in open mold position and urge said end mold sections toward the closed mold position as the glass reaches a predetermined heated temperature.

6. In apparatus for bending glass sheets or plates, a periphery type mold having a shaping surface conforming to the marginal area of a bent glass sheet, the mold being formed of a central mold section and hingedly related end mold sections, a support for the central mold section, the end mold sections being movable with reference to the central mold section from a closed to an open mold position to receive an unbent sheet of glass therebetween, transversely disposed shafts rotatably supported on the said support equidistantly from the ends thereof, lever arms affixed to the shafts intermediate their ends, linkage means interconnecting the lever arms to the end mold sections, weighted arms carried on the shafts for urging the lever arms to move said end mold sections to the closed mold position and shape the glass when properly heated into conformity therewith, and means substantially synchronizing the rotation of the shafts to produce substantially simultaneous opening and closing movements of the end mold sections.

7. In apparatus for bending glass sheets or plates, an open outline mold having a shaping surface conforming to the marginal area of a bent glass sheet, the mold being formed of a stationary central mold section and hingedly related end mold sections, a support for the central mold section, the end mold sections being movable with reference to the central mold section from a closed to an open position for receiving unbent sheets of glass therebetween, means associated with each of the end mold sections for locating the glass sheets in proper registry with the shaping surface of the mold, transversely disposed shafts rotatably supported on the support equidistantly from the ends thereof, a lever affixed to each shaft intermediate its ends, a link member interconnecting said lever to an adjacent end mold section, means substantially synchronizing the rotation of the shafts, a weighted arm supported at one end of each shaft in angular relation to said lever to cause rotation of the same with gradually increasing force, the force of said weighted arms being counterbalanced by the end mold sections and the unbent glass sheets when cold and gradually increasing as the glass becomes properly heated thereby rotating said shafts and moving the said end mold sections to the closed mold position.

8. In apparatus for bending glass sheets or plates, an open outline mold having a shaping surface conforming to the marginal area of a bent glass sheet, the mold being formed of a stationary central mold section and hingedly related end mold sections, said end mold sections being movable with reference to the central mold section from a closed to an open mold position to receive unbent glass sheets therebetween, means associated with each of the end mold sections for locating the glass in proper registry thereupon, a support for the central mold section, transversely disposed shafts rotatably supported on the support equidistantly from the ends thereof, levers affixed to the shafts intermediate their ends, a link member interconnecting each of the levers and an adjacent end mold section whereby rotation of the shafts will move said mold sections between the closed and open mold positions, disks secured to one end of each shaft, a link pivotally connected at each end to an adjacent disk for substantially synchronizing the rotation of the shafts, a weighted arm supported at the opposite end of each shaft and angularly disposed in relation to the associated levers, the influence of each weighted arm being variable in force during the bending operation whereby a counterbalance will be effected between said weighted arms and the end mold sections to support the same in the open mold position during the initial stages of bending and the potential force of each weighted arm subsequently increased to move the end mold sections into the mold closed position at the completion of the bending operation.

9. In apparatus for bending glass sheets or plates, an open outline mold having a shaping surface conforming to the marginal area of a bent glass sheet, the mold being formed of a stationary central mold section and hingedly related end mold sections, a support for the central mold section, the end mold sections being movable with reference to the central mold section from a closed to an open position for receiving unbent sheets of glass therebetween, means associated with each of the end mold sections for locating the glass sheets in proper registry with the shaping surface of the mold, transvervely disposed shafts rotatably supported on the support equidistantly from the ends thereof, a lever affixed to each shaft intermediate its ends, a link member interconnecting said lever to an adjacent end mold section, a weighted arm supported at one end of each shaft in angular relation to said lever to cause rotation of the same with progressively increasing force, a gear secured to the opposite end of each shaft, a gear rotatably mounted on said support intermediate the gears on said shafts, a pair of gear tooth racks, one of the gear racks being in meshed engagement with one of the first named gears and the second named gear to cause similar rotation in the same direction of movement, the second gear rack being in meshed engagement with the other of the first named gears and the second named gear to cause an opposed rotation of movement of said first named gears, the said force of said weighted arms being operable through said shafts and associated gears and gear racks to equally counterbalance the end mold sections in an open mold position and synchronously move said end mold sections toward the closed mold position with progressively increasing force.

10. In a bending mold for bending glass sheets, a pair of first mold sections comprising ends of the mold, a pair of second mold sections in end to end relation with said first mold sections, means for mouning said first mold sections above said second mold sections and for swinging rotative movement from first positions away from said second mold sections to a second position in which the first mold sections form substantially continuations of the second mold sections and together said mold sections define curvatures to which a glass sheet is to be bent, guide plates connected to said first mold sections for contacting the ends of a glass sheet during the bending thereof and while said first mold sections are moving from the first to the second positions, means for supporting the second mold sections for pivotal movement through arcs of fixed radius about fixed axes, and means for connecting said mold sections to one another whereby the movement of said mold sections is substantially synchronized.

References Cited by the Examiner
UNITED STATES PATENTS

| | | | |
|---|---|---|---|
| 682,570 | 9/1901 | Sage | 65—287 |
| 760,959 | 5/1904 | Connington | 65—158 |
| 2,330,349 | 9/1943 | Galey | 65—291 |
| 2,518,951 | 8/1950 | Smith | 65—290 |
| 2,554,572 | 5/1951 | Jendrisak | 65—289 |

DONALL H. SYLVESTER, *Primary Examiner.*

WILLIAM B. KNIGHT, *Examiner.*

UNITED STATES PATENT OFFICE
CERTIFICATE OF CORRECTION

Patent No. 3,220,822                      November 30, 1965

Joseph E. Jendrisak

It is hereby certified that error appears in the above numbered patent requiring correction and that the said Letters Patent should read as corrected below.

In the heading to the printed specification, line 9, for "July 5, 1961" read -- July 5, 1951 --; line 10, for "Ser. No. 344,156" read -- Ser. No. 344,165 --; column 5, line 12, for "shelding" read -- shielding --; column 8, line 51, after "This" insert -- is --; column 12, line 42, for "mouning" read -- mounting --.

Signed and sealed this 29th day of November 1966.

(SEAL)
Attest:

ERNEST W. SWIDER                                    EDWARD J. BRENNER
Attesting Officer                                             Commissioner of Patents